(12) United States Patent  
Brombal et al.

(10) Patent No.: US 8,203,993 B2  
(45) Date of Patent: Jun. 19, 2012

(54) PROVIDING IMPROVED POST-DIAL DELAY AT AN ORIGINATING TERMINAL

(75) Inventors: David S. Brombal, Plano, TX (US); Mark A. Stegall, Melissa, TX (US)

(73) Assignee: Rockstar Bidco, LP, New York, NY (US)

( * ) Notice: Subject to any disclaimer, the term of this patent is extended or adjusted under 35 U.S.C. 154(b) by 1209 days.

(21) Appl. No.: 11/388,276

(22) Filed: Mar. 24, 2006

(65) Prior Publication Data

US 2006/0233333 A1    Oct. 19, 2006

Related U.S. Application Data

(60) Provisional application No. 60/664,866, filed on Mar. 24, 2005.

(51) Int. Cl.
  *H04W 4/00* (2009.01)
  *H04L 1/00* (2006.01)
(52) U.S. Cl. .................................. 370/328; 370/236
(58) Field of Classification Search .......... 370/328, 370/352, 329, 236–236.2, 344, 347; 375/260, 375/267; 379/219, 114.2
  See application file for complete search history.

(56) References Cited

U.S. PATENT DOCUMENTS

| | | | |
|---|---|---|---|
| 6,757,732 B1 | 6/2004 | Sollee et al. | |
| 6,934,279 B1 * | 8/2005 | Sollee et al. | 370/352 |
| 7,616,746 B2 * | 11/2009 | O'Neill | 379/114.01 |
| 2003/0007622 A1 * | 1/2003 | Kalmanek et al. | 379/219 |

OTHER PUBLICATIONS

Rosenberg et al; Reliability of provisional responses in the session initiation protocol (SIP); Jun. 2002; Network working group; pp. 2 and 5.*
Steve, Donovan; SIP 183 session progress message; Oct. 1999; pp. 9, 10 and 11.*
3rd Generation Partnership Project 2 ("3GPP2"), 3GPP2 X.P0013-014 Proposed Baseline Text, "Simplified IMS/MMD Call Flow Examples," pp. 1-14 (May 2005).
S. Donovan et al., Internet Engineering Task Force, Internet Draft, "SIP 183 Session Progress Message," pp. 1-24 (Apr. 2000).
J. Rosenberg et al., Network Working Group, RFC 3262, "Reliability of Provisional Responses in the Session Initiation Protocol (SIP)," pp. 1-14 (Jun. 2002).
J. Rosenberg et al., Network Working Group, RFC 3311, "The Session Initiation Protocol (SIP) Update Method," pp. 1-13 (Sep. 2002).
J. Rosenberg et al., Network Working Group, RFC 3261, "SIP: Session Initiation Protocol," pp. 1-269 (Jun. 2002).

* cited by examiner

*Primary Examiner* — Michael Faragalla
(74) *Attorney, Agent, or Firm* — Saul Ewing LLP

(57) ABSTRACT

To provide expedited ringback at an originating terminal, a call request is sent from the originating terminal to a destination device over an Internet Protocol (IP) network. Local resource reservation is performed by the originating terminal after sending the call request. A first message is received by the originating terminal prior to the originating terminal sending a second message indicating that local resource reservation has been performed, the first message for indicating that alerting is being performed at the destination device. In response to receiving the first message and determining that the local resource reservation has been performed, a ringback indicator is generated by the originating terminal.

20 Claims, 3 Drawing Sheets

PROVIDING IMPROVED POST-DIAL DELAY AT AN ORIGINATING TERMINAL

CROSS-REFERENCE TO RELATED APPLICATION

This claims the benefit under 35 U.S.C. §119(e) of U.S. Provisional Application Ser. No. 60/664,866, filed Mar. 24, 2005, which is hereby incorporated by reference.

TECHNICAL FIELD

The invention relates generally to providing improved post-dial delay at an originating terminal.

BACKGROUND

Packet data networks, including wired networks and/or wireless networks, are used to link various types of network devices, such as personal computers, network telephones, mobile telephones, personal digital assistants (PDAs), and so forth. A widely used type of packet data network is the Internet Protocol (IP) network, in which data communications are performed using packets or datagrams.

With the increased capacity and reliability of packet data networks, voice communications (including telephone calls, video conferencing, and so forth) over such packet data networks have been implemented. Voice communications over packet data networks are unlike voice communications in a conventional circuit-switched network (such as a public switched telephone network), in which users are provided dedicated end-to-end circuit connections for the duration of each call. In a packet data network, voice data is carried in packets or datagrams that are sent in bursts from a source to one or more destination nodes. Voice data that is sent over a packet data network typically shares network bandwidth with conventional non-voice data, such as data associated with electronic mail, web access, file transfer, text chat sessions, and so forth.

Various standards have been proposed for establishing voice and multimedia communications over packet data networks. One example standard that defines control signaling used for establishing voice and multimedia communications is the Session Initiation Protocol (SIP), which defines messaging for establishing, controlling, and terminating multimedia sessions over a packet data network, such as an IP network. SIP is part of a multimedia data and control architecture developed by the Internet Engineering Task Force (IETF). In packet-switched wireless networks, the Third Generation Partnership Project (3GPP) and 3GPP2 have defined standards for SIP call flows. Other organizations have also defined SIP call flows for use in wired and/or wireless networks.

SIP is a text-based protocol that defines SIP messages having a text format, which tends to make SIP messages relatively large in size. As a result, the increased time involved in communicating SIP messages may cause call setup times to become longer. In addition to larger SIP message sizes, another cause of relatively long call setup times is that more SIP messages are involved in establishing a call session (particularly when extra messages are sent to provide reliability) than has been traditionally the case in circuit-switched networks.

As a result of a relatively long call setup time, there may be excessive delay between when a caller starts a call (such as by activating the "Send" button on a phone or completion of dialing digits) and when the caller receives an indication of ringing (ringback that indicates that the called party is being alerted). The interval between the time a caller starts a call and the time when ringback is received by the caller is referred to as post-dial delay (PDD). Excessive PDD can cause user dissatisfaction. In some cases, a user may simply hang up if there is excessive PDD, since the user may incorrectly believe that the call has been dropped when in fact call establishment is proceeding in the packet data network among various nodes.

SUMMARY

In general, methods and apparatus according to some embodiments provide improved post-dial delay at an originating terminal.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
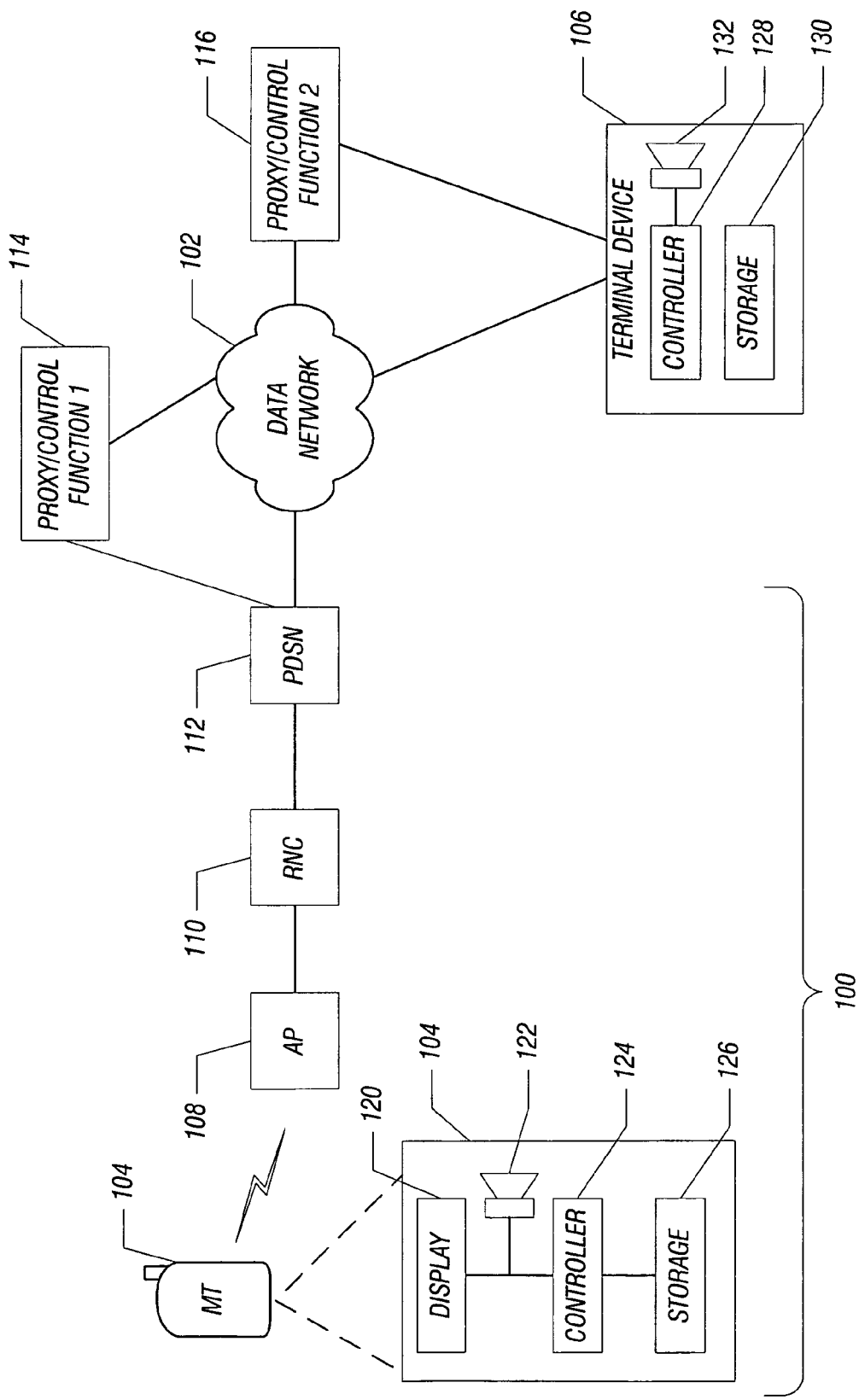
FIG. 1 is a block diagram of an example communications network that incorporates an embodiment of the invention.

FIG. 1 illustrates an example communications network that includes a wireless network 100 that is connected to a packet data network 102. Although reference is made to a "packet data network," it is to be understood that "packet data network" can actually refer to one or plural packet data networks that are coupled by one or more intermediate routers. For example, the packet data network 102 can actually include various different types of networks, such as local area networks (LANs), wide area networks (WANs), wireless local area networks (WLANs), and so forth. The wireless network 100 is a packet-switched wireless network in which packet-switched communications can be performed (e.g., packet-switched telephony, web browsing, electronic mail, file transfer, and so forth).

The wireless network 100 allows a mobile terminal 104 to communicate with network devices on the packet data network 102, such as a terminal device 106, or to other devices on wireless network 100. The terminal device 106 can be an end user device (such as a network telephone, voice-enabled personal computer, or voice-enabled personal digital assistant), or alternatively, the terminal device 106 can be a media gateway that connects the packet data network 102 to a circuit-switched network such as the public switched telephone network (PSTN) or a circuit-switched wireless network. Instead of or in addition to the terminal device 106, a second packet-switched wireless network can be connected to the packet data network 102 such that the mobile terminal 104 in the wireless network 100 can communicate through the packet data network 102 to another mobile terminal in the second wireless network.

The arrangement of FIG. 1 is provided for purposes of example, since numerous other arrangements are possible in other embodiments. For example, the wireless network 100 can be omitted and replaced with a user device (such as a network telephone, a voice-enabled personal computer, or a voice-enabled personal digital assistant) that is able to establish a packet-switched telephony call session with the terminal device 106 (or other terminal devices).

In accordance with some embodiments, the mobile terminal 104 (or other user terminal) is able to establish a packet-switched telephony call session with the terminal device 106 (or with another terminal device on the packet data network 102). A packet-switched telephony call session refers to a communications session in which voice data (and possibly other real-time data such as video data) is exchanged between the two end terminals, where the voice data (and/or other real-time data) is encapsulated in packets that are communicated through the packet data network 102 and through various access networks (such as the wireless network 100).

An example protocol that provides for packet-switched communications is the Internet Protocol (IP). IPv4 (IP version 4) is defined in Request for Comments (RFC) 791, entitled "Internet Protocol," dated September 1981; and IPv6 (IP version 6) is described in RFC 2460, entitled "Internet Protocol, Version 6 (IPv6) Specification," dated December 1998. In the IP context, a packet-switched telephony call session is referred to as a "voice-over-IP call session" or "telephony-over-IP call session." A packet data network that communicates IP packets is referred to as an IP network.

Various standards exist that define control signaling to be used for establishing, controlling, and terminating packet-switched telephony call sessions between end devices coupled to the packet data network 102. One example standard is the Session Initiation Protocol (SIP). The base version of SIP is defined in RFC 3261, entitled "SIP: Session Initiation Protocol," dated June 2002. Extensions of SIP are defined in other documents, such as RFC 3262, entitled "Reliability of Provisional Responses in the Session Initiation Protocol (SIP)," dated June 2002; and RFC 3311, entitled "The Session Initiation Protocol (SIP) UPDATE Method," dated September 2002.

Other standards have also been proposed for defining control signaling for packet-switched telephony call sessions. One such other standard is the H.323 Recommendation from the International Telecommunications Union (ITU). Alternatively, proprietary signaling protocols can be used for establishing, controlling, and terminating packet-switched call sessions, including versions of SIP that include proprietary messages. In the context of the present application, reference to "SIP" refers to standard SIP, extensions of SIP, as well as any modified versions of SIP, whether proprietary or public.

SIP messages have a text format, which tends to make SIP messages relatively large in size. Also, to provide for enhanced reliability, there may be a relatively large number of SIP messages exchanged between an originating terminal and a destination device when establishing a packet-switched telephony call session. Consequently, in some cases, post-dial delay associated with packet-switched telephony call session establishment can be quite large. The post-dial delay is the interval of time between a caller starting a call session, such as by activating a "Send" button, completing the dialing of telephone number digits, or activating a control element in a graphical user interface (GUI), and the time when the originating terminal generates a ringback indicator. A ringback indicator refers to a ringing indication (or other indication) that indicates the destination device is being alerted or is in the process of being alerted. The destination device is "being alerted" when the destination device (or network infrastructure associated with the destination device) either (1) has provided the alert to the called party, or (2) is in the process of causing the alert to be generated, in response to a call request from the originating terminal.

Various SIP signaling flows being considered by standards, such as 3GPP (Third Generation Partnership Project) and 3GPP2 standards, typically use a "precondition" mechanism. The precondition mechanism refers to use of a field in the SIP Invite message (the field being "Require:precondition" in one example implementation) that indicates various bearer resources at the originating end and at the destination end have to be reserved prior to completion of call establishment (and provision of a ringback indicator at the originating terminal). For example, in the wireless context, the resources that have to be reserved include various wireless resources (such as radio resources) and so forth. Conventionally, use of the precondition mechanism requires two end-to-end roundtrip message exchanges of control messages to establish a call. The first exchange typically involves a SIP Invite/183 Progress message pair that allows exchange of media preferences, in which preconditions are indicated as not being met. The Invite message is a call request to indicate that the destination device is being invited to participate in the call session. The 183 Progress message (a session progress message) is used to convey information about the progress of the call that is not otherwise classified.

After each end (originating end and terminating end) completes reservation of bearer resources, a second exchange of messages involves a SIP Update/200 OK message pair used to communicate that the preconditions have been satisfied (a fulfilled precondition status) for each end, which confirms bearer path availability. The SIP Update message allows a client (such as the originating terminal) to update parameters of a session (e.g., indicate that resource reservation has completed). The SIP 200 OK message is used to indicate that a request has succeeded.

For devices that do not support the precondition mechanism, an alternate technique of ensuring that local resources have been reserved prior to completion of call establishment involves the exchange of messages that contain a Session Description Protocol (SDP) attribute that indicates whether a media stream is inactive or active. The initial SIP Invite message is sent with the SDP attribute (a=inactive) set to indicate that the media stream is inactive. After a response message to the Invite message, a second exchange of messaging involves sending messages with the SDP attribute set to indicate the media stream is active (a=active), which is an indication that local resource reservation has been completed. However, even with this alternative technique, two roundtrip exchanges of messages containing the SDP attribute is performed prior to completion of call establishment (and provision of a ringback indicator by the originating terminal).

In either of the scenarios described above, the provision of a ringback at the originating terminal can be substantially delayed, resulting in a long post-dial delay. In accordance with some embodiments, to enhance user experience and satisfaction and to avoid a user prematurely ending a call by hanging up when the user does not hear a ringback indicator for some time, a mechanism to reduce the delay of a ringback is provided. In accordance with some embodiments, rather than waiting for two roundtrip exchanges of messages before ringback can occur, the ringback is provided without having to wait for the second roundtrip exchange of messages to first confirm reservation of local resources.

In general, reduced (improved) post-dial delay is achieved by the originating terminal performing resource reservation after sending a call request, and the originating terminal receiving a ring message from the destination device, and then the originating terminal providing ringback prior to the originating terminal sending a message (such as an update message) to indicate that local resource reservation has been performed at the originating terminal. A "ring message" refers to a message for indicating that a destination device is being alerted. An "update message" refers to a message used to update parameters of a call. Examples of the ring message and update message include the SIP Ringing and SIP Update messages, respectively. Note, however, that other types of messages can be used in other embodiments. For example, the update message can be implemented with a SIP PRACK message (a provisional acknowledge message).

The ringback indicator is generated by the originating terminal in response to the ring message and in response to determining that local resource reservation at the originating terminal has been completed. Note that the ring message that is received prior to a second roundtrip exchange of messages relating to confirmation of local resources is an early ring message. An "early ring message" refers to a ring message that is sent by a destination device prior to the destination device actually being ready to generate the alert at the destination device. The destination device is ready to generate the alert at the destination device after the destination device receives a message from the originating terminal that confirms local resource reservation at the originating terminal. The ringback indicator can thus be generated earlier before the second roundtrip of messages for confirming local resource reservation, which reduces post-dial delay to enhance the user experience in establishing a packet-switched telephony call session.

As further depicted in FIG. 1, the mobile terminal 104 performs wireless communications (e.g., radio frequency communications) with an access point (AP) 108. The access point 108 (sometimes referred to as a base transceiver station) is part of a cell segment (either a cell or a cell sector). The wireless network 100 includes multiple cell segments in which mobile terminals can communicate with respective access points over radio frequency (RF) links.

The access point 108 is coupled to a radio network controller (RNC) 110 (sometimes referred to as a base station controller or BSC). In some implementations, the wireless network 100 is a CDMA 2000 network, such as a 1xRTT network or a 1xEVDO or 1xEVDV network. Other types of networks, such as UMTS (Universal Mobile Telecommunications System) networks can also be employed in other implementations. The RNC 110 supports packet-switched communications in which packet data is communicated between the mobile terminal 104 and another endpoint. The RNC 110 is coupled to a packet data serving node (PDSN) 112. The RNC 110 supports packet data services through the PDSN 112, which in turn is connected to the packet data network 102. Call establishment using SIP in packet-switched wireless networks has been defined by 3GPP (for UMTS networks) and 3GPP2 (for CDMA 2000 networks).

FIG. 1 also depicts a first proxy/control function module 114. The first proxy/control function module 114 includes a proxy component that makes requests on behalf of a client, such as the mobile terminal 104 when the mobile terminal 104 is involved in establishing a packet-switched telephony call session (either as an originator or a destination). The control function aspect of the module 114 provides session control to enable clients such as the mobile terminal 104 to access services in a particular network. An example of the proxy/control function module 114 is the call session control function (CSCF) module that is part of the IP multimedia sub-system (IMS) architecture. Note that there can be several types of CSCF modules, including a proxy CSCF, an interrogating CSCF, and a serving CSCF. The proxy/control function module 114 can refer to any one of or some combination of these CSCFs. In other implementations, the proxy/control function module 114 can be other types of control modules involved in call establishment involving the mobile terminal 104.

FIG. 1 also depicts a second proxy/control function module 116 that is similar to the first proxy/control function module 114, except that the second proxy/control function module 116 is associated with the terminal device 106 (instead of with mobile terminal 104). In an example where the mobile terminal 104 is the originating terminal, and the terminal device 106 is the destination terminal, the first proxy/control function module 114 is considered the originator's proxy/control function module, while the second proxy/control function module 116 is considered the terminator's proxy/control function module. More generally, the proxy/control function modules can be simply referred to as "call control function modules."

The mobile terminal 104 has a display 120 and an audio speaker 122 (as well as a microphone, not shown). In accordance with some embodiments, the audio speaker 122 is used for outputting an audio ringback indicator, while the display 120 can be used for displaying a visual ringback indicator. The display 120 and the audio speaker 122 are examples of an output device that is used to present the ringback indicator. The mobile terminal 104 also includes a controller 124 and a storage 126. The controller 124 is used for controlling various functions of the mobile terminal 104. The controller 124 can be implemented with various types of control devices, such as microcontrollers, microprocessors, digital signal processors, and so forth. The storage 126 is used for storing data and instruction code that can be executed on the controller 124.

The terminal device 106 similarly includes a controller 128 and a storage 130. If the terminal device 106 is an end user device, then the terminal device 106 also includes an audio speaker 132 for outputting audio signals, such as an alert signal (when a call is made to the terminal device). If the terminal device 106 is a media gateway (rather than an end user terminal), then the audio speaker 132 is not included in the terminal device 106, but rather the terminal device 106 provides some indication to a remote end user device to generate an alert.

Figure 2:
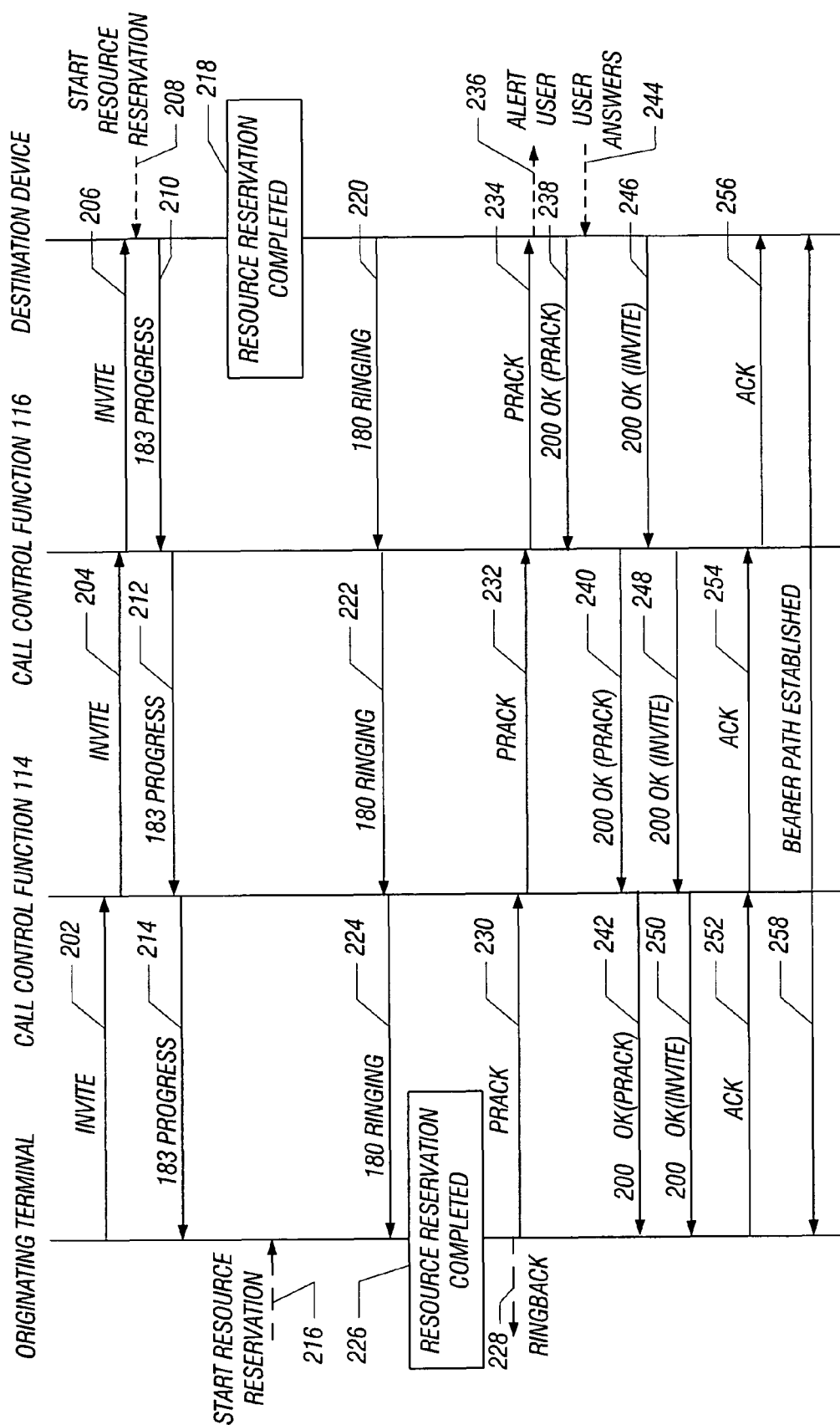
FIG. 2 is a message flow diagram of a first process of establishing a call session in which improved (reduced) post-dial delay is provided at an originating terminal, in accordance with an embodiment.

FIG. 2 illustrates a flow diagram for establishing a packet-switched telephony call session according to some embodiments. The flow diagram of FIG. 2 involves the communication of SIP messages among various nodes, including an originating terminal (e.g., mobile terminal 104), a destination device (e.g., terminal device 106), and the call control function modules 114, 116. In a different scenario, one or both of the call control function modules 114, 116 can be omitted. Also note that various messages that are typically exchanged (such as the SIP Trying message and other messages) are omitted in FIG. 2 for the purpose of better clarity.

To initiate the packet-switched telephony call session, the originating terminal transmits (at 202) a SIP Invite message to the call control function module 114. The Invite message is sent by the originating terminal in response to user activation of some call control element at the originating terminal (such as a "Send" button, completion of dialing of digits corresponding to a called telephone number, activation of a graphical user interface (GUI) element indicating initiation of a call request, and so forth). The Invite message indicates that the destination device is being invited to participate in the call session. The message body of the Invite message contains a description (e.g., an SDP description) of the session to which the destination device is being invited. The description in the Invite message may also indicate preconditions that have to be satisfied, such as reservation of local resources. Examples of local resource reservation include reservation of bearer resources (e.g., radio resources), packet data protocol (PDP) context activations, quality of service (QoS) reservations, and so forth.

In response to the Invite message, the call control function module 114 forwards an Invite message (at 204) to the destination call control function module 116, which in turn sends (at 206) an Invite message to the destination device. In accordance with some embodiments, upon receiving the Invite message at 206, the destination device starts (at 208) local resource reservation (as specified in the SDP description of the Invite message) at the destination device. Also, in response to the Invite message, the destination device returns (at 210) a 183 Progress message to the destination call control function module 116. The 183 Progress message is used to indicate some kind of progress is occurring at the destination device. In response to the 183 Progress message at 210, the destination call control function module 116 sends a 183 Progress message (at 212) to the originating call control function module 114, which in turn sends a 183 Progress message (at 214) to the originating terminal. Upon receipt of the 183 Progress message at 214, the originating terminal starts (or completes if already started) local resource reservation (at 216).

Reference is made herein to the originating terminal and destination device sending messages to or receiving messages from each other. Note that the terms "to" and "from" are used to indicate direct or indirect sending or receipt of messages between the originating terminal and destination device. For example, the originating terminal can send a message to the destination device either directly or indirectly through intermediate nodes such as modules 114 and 116.

Once local resource reservation has completed (at 218) at the destination device, the destination device sends a 180 Ringing message (at 220) to the destination call control function module 116, which in turn causes 180 Ringing messages to be forwarded back (at 222, 224) to the originating call control function module 114 and originating terminal, respectively. The 180 Ringing message is an indication that the destination device is alerting a called party. However, in accordance with some embodiments, although the 180 Ringing message is sent at 220 by the destination device, called party alert is actually not occurring at the destination device. This is because the destination device is waiting for some acknowledgment from the originating terminal that resource reservation has completed at the originating terminal, such that "ghost ringing" does not occur at the destination device. Ghost ringing refers to a false alert generated at the originating terminal or destination device in a scenario where local resources at the originating terminal or destination device fail to be reserved for the bearer or media path. Thus, in accordance with some embodiments, although a ring message (e.g., the 180 Ringing message) has been sent by the destination device, alerting of the called party is not being performed since the destination device is not yet ready to perform the alert. The early transmission of the ring message by the destination device is to enable earlier or expedited ringback at the originating terminal.

The originating terminal starts resource reservation (at 216) (or completes resource reservation if already started) upon receiving the 183 Progress message. When resource reservation is completed (at 226) at the originating terminal and the 180 Ringing message has been received (in either order), a ringback indicator is generated (at 228) by the originating terminal. The ringback indicator can be an audio indicator (such as a ring) or a visual indicator to indicate that ringing is occurring at the destination device (in other words, the called party is being alerted). Note, however, that ringing has in fact not occurred yet at the destination device when the ringback indicator is generated (at 228) at the originating terminal.

Once local resource reservation is completed (at 226) at the originating terminal, the originating terminal sends (at 230) a PRACK message for the 180 Ringing message to the destination terminal for reliability purposes. The PRACK message contains an indication that local resource reservation has been completed at the originating terminal. In this context, the PRACK message is used as the update message referred to above. In response to the PRACK message at 230, the call control function module 114 and the call control function module 116 send (at 232, 234) PRACK messages, respectively, with the PRACK message sent at 234 received by the destination device.

In response to receiving the PRACK message, the destination device generates (at 236) an alert to the user of the destination device. 200 OK messages are sent (at 238, 240, 242) by the destination device, destination call control function module 116, and originating call control function module 114, respectively, in response to the PRACK messages. When the user answers (at 244) at the destination device (e.g., such as by taking the destination device off-hook), 200 OK messages are sent (at 246, 248, 250) by the destination device, destination call control function module 116, and originating call control function module 114, respectively, to acknowledge the Invite message, which indicates that the Invite request (or call request) has succeeded.

In response to the 200 OK message received at 250, the originating terminal sends (at 252) an ACK message which is an acknowledgment of the 200 OK message received at 250. In turn, the originating call control function module 114 and destination call control function module 116 send (at 254, 256, respectively) ACK messages, with the ACK message at 256 received by the destination device. The bearer path is established (at 258) between the originating terminal and destination device in response to the OK message received at 250.

Figure 3:
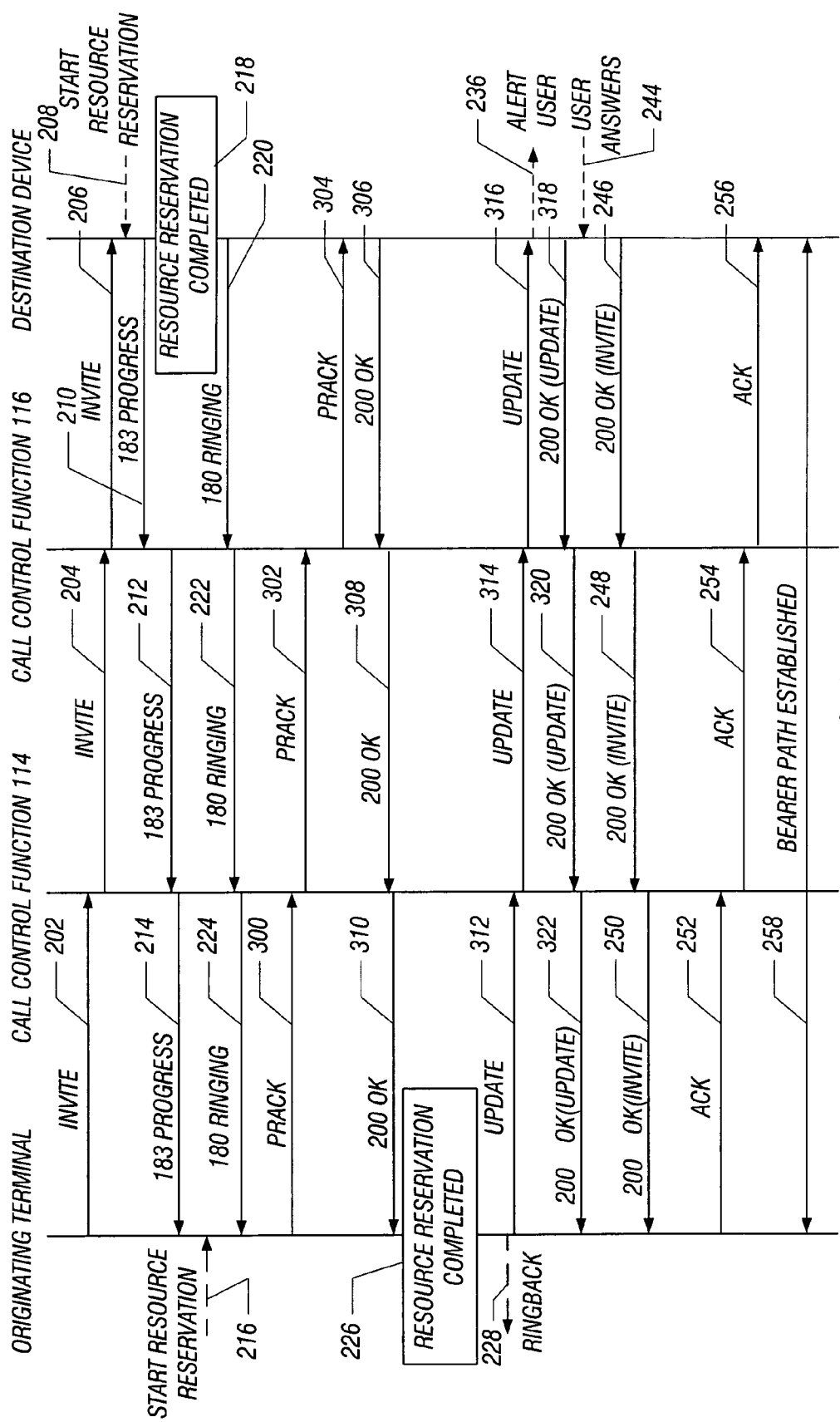
FIG. 3 is a message flow diagram of a second process of establishing a call session in which improved post-dial delay is provided to an originating terminal, in accordance with another embodiment.

FIG. 3 shows an alternative message flow for establishing a call session. Messages that are identical to messages transmitted in the message flow diagram of FIG. 2 share the same reference numerals. Thus, the initial exchange of messages, including Invite, 183 Progress, and 180 Ringing, among the nodes is identical. However, one difference between the message flow of FIG. 2 and the message flow of FIG. 3 is that a PRACK message is sent (at 300) in response to the 180 Ringing message at 224 that is received by the originating terminal. The PRACK message sent at 300 is provided to satisfy the requirement that PRACK is to be transmitted by the originating terminal within some minimum time period after receipt of 180 Ringing. In response to the PRACK message at 300, the originating call control function module 114 and destination call control function module 116 send (at 302, 304, respectively) PRACK messages, with the PRACK message at 304 received by the destination device. In response to the PRACK message, 200 OK messages are sent (at 306, 308, 310) by the destination device, destination call control function module 116, and originating call control function module 114, respectively.

Upon completion of local resource reservation (at 226) by the originating terminal, the originating terminal generates (at 228) a ringback indicator (similar to the FIG. 2 embodiment) and sends (at 312) a SIP Update message (which is different from the FIG. 2 embodiment). The SIP Update message allows a client (such as the originating terminal) to update parameters of a session, such as to indicate that local resource reservation has completed. In response to the Update message at 312, the originating call control function module 114 sends an Update message (at 314) to the destination call control function module 116, which in turn sends (at 316) an Update message to the destination device. Upon receipt of the Update message at 316, the destination device generates an alert (at 236) to the user of the destination device. 200 OK messages are sent (at 318, 320, 322) to acknowledge the Update messages 312, 314, 316. When the user answers (at 244), 200 OK message are sent (at 246, 248, 250). The remaining call flow is identical to the FIG. 2 call flow.

Note that the call flows depicted in FIGS. 2 and 3 are provided for purposes of example. In other embodiments, many other call flows can be employed while still falling within the scope of the invention.

By using the message flow of either FIG. 2 or FIG. 3 (or some other call flow), an expedited ringback indicator is provided upon receipt of an early ring message from the destination device and completion of local resource reservation at the originating terminal. The expedited ringback indicator is generated prior to the originating terminal sending out a message (such as PRACK at 230 or Update at 312) indicating that local resource reservation has been completed at the originating terminal. Consequently, the originating terminal does not have to wait for a second round-trip of messages relating to confirmation of local resource reservation to generate the ringback indicator. This reduces the post-dial delay between initiation of the call (by sending the Invite message) and generation of the ringback indicator.

Instructions of various software modules (e.g., software modules executed in the mobile terminal 104 or terminal device 106 of FIG. 1 to perform the various tasks described herein) are loaded for execution on corresponding processors (e.g., controller 124 or 128 in FIG. 1). Processors include microprocessors, microcontrollers, processor modules or subsystems (including one or more microprocessors or microcontrollers), or other control or computing devices. As used here, a "control module" refers to hardware, software, or a combination thereof. A "control module" can refer to a single component or to plural components (whether software or hardware).

Data and instructions (of the software) are stored in respective storage devices (e.g., storage 126 or 130 in FIG. 1), which are implemented as one or more machine-readable or computer-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While some embodiments have been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method to provide improved post-dial delay at an originating terminal, comprising:
    sending a call request from the originating terminal to a destination device over an Internet Protocol (IP) network;
    performing local resource reservation by the originating terminal after sending the call request;
    receiving an early ring message by the originating terminal prior to the originating terminal sending a second message indicating that the local resource reservation has been performed, wherein the early ring message is sent by the destination device even though the destination device is not yet ready to provide an alert at the destination device in response to the call request;
    in response to receiving the early ring message and determining that the local resource reservation has been performed, generating a ringback indicator by the originating terminal; and
    in response to determining that the local resource reservation has been performed, sending the second message toward the destination device.

2. The method of claim 1, wherein performing local resource reservation by the originating terminal comprises performing wireless network resource reservation by the originating terminal.

3. The method of claim 1, wherein receiving the early ring message comprises receiving a Session Initiation Protocol (SIP) Ringing message, and wherein sending the second message comprises sending a SIP Update message.

4. The method of claim 1, wherein receiving the early ring message comprises receiving a Session Initiation Protocol (SIP) Ringing message, and wherein sending the second message comprises sending a SIP WRACK message.

5. The method of claim 1, wherein receiving the early ring message comprises receiving a ring message that is initiated on behalf of the destination device prior to the destination device receiving the second message indicating that the local resource reservation has been performed.

6. The method of claim 1, wherein sending the second message to the destination device causes the destination device to alert a called party.

7. An article comprising at least one non-transitory computer-readable storage medium containing instructions that when executed cause a destination device to:
    receive a call request from an originating terminal to establish a packet-switched call session over an Internet Protocol network;
    in response to receiving the call request, performing local resource reservation by the destination device;
    upon completion of the local resource reservation by the destination device, send an early ring message to the originating terminal to enable expedited ringback at the originating terminal, the early ring message being sent prior to receiving a second message from the originating terminal indicating that local resource reservation by the originating terminal has been completed, and the early ring message being sent even though the destination device is not yet ready to provide an alert at the destination device in response to the call request; and
    receive the second message that is sent by the originating terminal in response to the completion of local resource reservation by the originating terminal.

8. The article of claim 7, wherein the instructions when executed cause the destination device to further generate the alert in response to receiving the second message.

9. The article of claim 8, wherein the second message comprises one of a Session Initiation Protocol (SIP) PRACK message and a SIP Update message.

10. The article of claim 7, wherein receiving the call request comprises receiving the call request that contains a precondition relating to reservation of local resources.

11. The article of claim 10, wherein receiving the call request comprises receiving a Session Initiation Protocol (SIP) Invite message.

12. The article of claim 7, wherein receiving the call request comprises receiving a Session Initiation Protocol (SIP) Invite message, wherein sending the early ring message comprises sending a SIP Ringing message, and wherein the second message comprises one of a SIP PRACK message and an SIP Update message.

13. A terminal comprising:
an output device for outputting a ringback indicator; and
at least one processor to:
    send a call request to a destination device over an Internet Protocol (IP) network;
    perform local resource reservation at the terminal after sending the call request;
    receive an early ring message prior to the terminal sending a second message indicating that the local resource reservation has been performed, the early ring message sent by the destination device even though the destination device is not yet ready to provide the alert at the destination device in response to the call request;
    in response to receiving the early ring message and determining that the local resource reservation has been performed, generate the ringback indicator; and
    in response to completing the local resource reservation, send the second message toward the destination device.

14. The terminal of claim 13, wherein the second message comprises an update message.

15. The terminal of claim 13, wherein the local resource reservation comprises local wireless resource reservation.

16. The terminal of claim 13, wherein the call request comprises a Session Initiation Protocol (SIP) Invite message, the early ring message comprises a SIP Ringing message, and the second message comprises one of a SIP PRACK and SIP Update message.

17. The method of claim 1, wherein the destination device is ready to provide the alert upon receipt of the second message.

18. The method of claim 1, wherein the local resource reservation by the originating terminal comprises one or more of reservation of banner resources, packet data protocol context activation, and quality of service reservation.

19. The terminal of claim 13, wherein the destination device is ready to provide the alert upon receipt of the second message.

20. The terminal of claim 13, wherein the local resource reservation at the terminal comprises one or more of reservation bearer resources, packet data protocol context activation, and quality of service reservation.

* * * * *